United States Patent [19]
Muse et al.

[11] Patent Number: 6,043,954
[45] Date of Patent: *Mar. 28, 2000

[54] CARTRIDGE LOAD AND EJECT MECHANISM FOR A REMOVABLE CARTRIDGE DRIVE

[75] Inventors: Jay A. Muse, Centerville, Utah; Brian Schick, San Diego, Calif.

[73] Assignee: Iomega Corporation, Roy, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,935

[22] Filed: Aug. 29, 1997

[51] Int. Cl.⁷ .................................................. G11B 17/04
[52] U.S. Cl. ........................................................ 360/99.06
[58] Field of Search ............................................. 360/99.06

[56] References Cited

U.S. PATENT DOCUMENTS

| | | | |
|---|---|---|---|
| 3,854,784 | 12/1974 | Hunt et al. | 312/319 |
| 4,965,685 | 10/1990 | Thompson | 360/99.06 |
| 5,273,328 | 12/1993 | Kurosaki | 292/336.3 |
| 5,485,330 | 1/1996 | Hirose et al. | 360/99.06 |

*Primary Examiner*—A. J. Heinz
*Attorney, Agent, or Firm*—Woodcock Washburn Kurtz Mackiewicz & Norris LLP

[57] ABSTRACT

A system for inserting and ejecting a cartridge from a removable media disk drive is disclosed. The system works by pushing the cartridge into the drive until a stop is reached. Thereafter, when the pushing is ceased, the cartridge is locked into position in the disk drive. To eject the cartridge, the cartridge is again pushed into the drive until a second stop is reached. Thereafter, the cartridge is ejected from the drive.

8 Claims, 8 Drawing Sheets

CARTRIDGE LOAD AND EJECT MECHANISM FOR A REMOVABLE CARTRIDGE DRIVE

BACKGROUND OF THE INVENTION

This invention relates to cartridge based data storage systems. More particularly, the invention relates to the loading and ejection of a disk cartridge to and from a disk drive.

Cartridge based tape and disk data storage devices for storing digital electronic information have been in use in the computer industry for several decades. Removable disk cartridges typically comprise an outer casing or shell that houses a disk-shaped magnetic, magneto-optical or optical storage medium upon which information can be stored. The cartridge shell often comprises upper and lower halves that are formed of injection molded plastic and are joined together to house the disk. Magnetic disk media can be either rigid or flexible and are mounted on a hub that rotates freely within the cartridge. When the cartridge is inserted into a disk drive, a spindle motor in the drive engages the disk hub in order to rotate the disk within the cartridge at a given speed. The outer shell of the cartridge typically has a media access opening proximate one edge to provide the recording heads of the drive with access to the disk. A shutter or door mechanism is provided to cover the head access opening when the cartridge is not in use to prevent dust or other contaminants from entering the cartridge and settling on the recording surface of the disk. The shutter is commonly biased to a closed position with a spring bias. To open the shutter and gain access to the media, the drive employs a mechanism that overcomes the bias of the spring.

Disk drives for use with such removable disk cartridges typically employ either a linear actuator mechanism or a radial arm actuator mechanism for positioning the read/write head(s) of the disk drive on the recording surface(s) of the storage medium, or disk. Because the disk cartridges are designed to be removable from the drive, the linear or radial arm actuators must be able to move off, and away from, the storage medium to a retracted position in order to prevent damage to the head(s) when a cartridge is inserted and removed from the disk drive. Moreover, many removable cartridge disk drives employ a pair of opposing read/write heads for recording and reproducing information on both sides of a storage medium. Typically, the opposing heads are disposed on flexible suspension arms at the distal end of an actuator that allow the heads to fly closely over the respective surfaces of the rotating disk.

Disk drive also require a mechanism for allowing the heads to load only after a cartridge is inserted into the drive. The actuator that carries the recording heads of the disk drive across the recording surfaces of the disk should not be allowed to move unless a disk cartridge is present. In the prior art, mechanical or electrical switches are typically employed to determine the presence of a disk cartridge within the drive. Such switches are typically positioned so that when a disk cartridge is inserted fully into the drive, the cartridge contacts the switch, thereby providing an indication that the disk cartridge is present.

When a user has completed the use of a disk cartridge, a mechanism must be provided to eject the disk cartridge from the drive and substantially simultaneously ensure that the read/write heads are retracted from the disk into a predetermined safe position so as to prevent any damage to the read/write heads. Typically, a tray or spring loaded lever is used to push the cartridge out of the drive. The spring loaded tray or lever is often coupled to the head protection mechanism so that the heads protection occurs in unison with cartridge ejection. However, where it is desirable to make the disk drive as small as possible, the mechanisms for ejecting a disk cartridge and the linkage to the head retraction requires additional disk drive space. The result is a drive that is larger than desirable.

Therefore, there is a need for a compact disk insertion and ejection mechanism that overcomes the drawbacks of the prior art.

SUMMARY OF THE INVENTION

The present invention is directed to a data storage device of the type that accepts a removable cartridge such as a removable cartridge disk drive. The data storage device comprises a chassis and an actuator, which is coupled to the chassis. The actuator is the type that has an arm with a read/write head disposed on a distal end. The drive also has a sliding lever that is slidably coupled to the chassis and adapted to engage the removable cartridge and slide with the cartridge between an insertion and ejection position. A post is disposed on one end of the sliding lever. Moreover, a biasing means, such a spring, urges the sliding lever toward the ejection position. The drive further comprises a rotatable pinion that has a substantially triangular race. The triangular race has three legs with a catch in the second leg. The race accepts the post for travel therein such that the post travels along the first leg of the race when a first force is applied to the cartridge moving it to the insertion position. The bias means moves the post into the catch when the first force is released such that the cartridge is locked in the insertion position.

To eject the cartridge, a second force is applied to the cartridge such that the post travels out of the catch and along the second leg of the race. At that point, the biasing means moves the post along the third leg of the race when the second force is released such that the sliding lever moves to the ejection position thereby ejecting the cartridge.

The disk drive also has a pivoting pinion. The race is disposed in the pinion, and the pinion pivots between a first and a second position. The pinion rotates to the first position when the post travels along the race to the catch. The pinion rotates to the second position when the post travels along the race from the catch and along the third leg.

The disk drive also comprises an actuator locking mechanism that is coupled to the pinion. The actuator locking mechanism locks the actuator in a parked position when the pinion is in the second position and releases the actuator from the parked position when the pinion is in the first position. The actuator locking mechanism comprises a latch connected to the actuator and coupled with the pinion. The actuator could be a rotary or linear actuator.

The insertion and ejection mechanism of the disk drive operates by applying a first insertion force to insert and lock the cartridge in place and applying a second insertion force to unlock the cartridge and eject it from the drive.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF PREFERRED EMBODIMENT

The present invention provides a removable media type of disk drive and a corresponding exemplary cartridge. Throughout the description, a preferred embodiment of the invention is described in connection with exemplary components. For example, a disk cartridge is shown with particular dimensions and shape, and the drive is shown having a rotary actuator. However, the particular disk drive and cartridge shown are provided only to illustrate the operation of the present invention. Accordingly, the invention should not be limited to the particular cartridge or drive embodiment shown as the invention can be employed with other cartridge and drive types and configurations.

Figure 1:
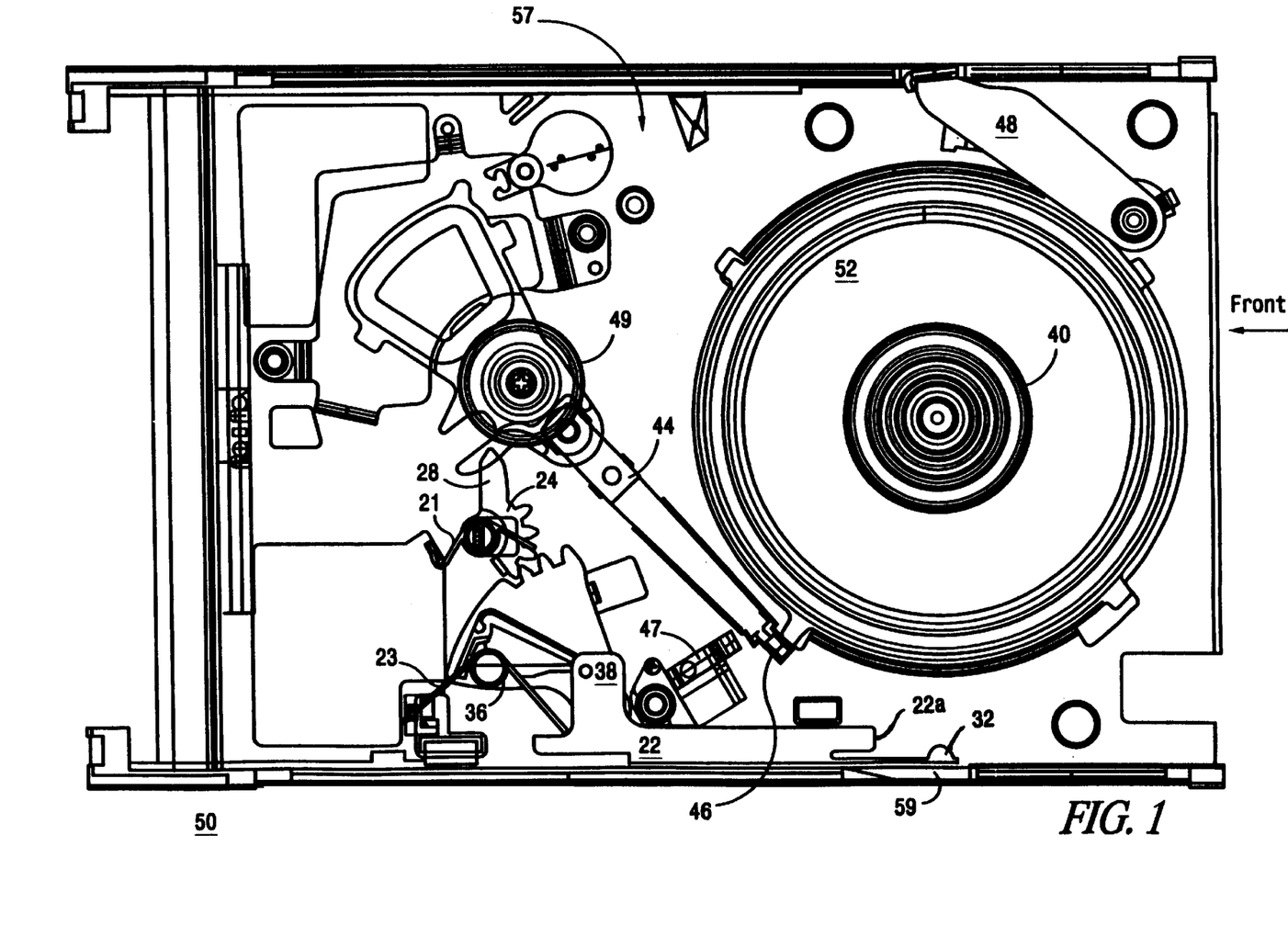
FIG. 1 is a top plan view of a disk drive according to the present invention.

FIG. 1 is a top view of a disk drive 50 with its top cover removed and the components moved from there relative operational positions for clarity. Drive 50 comprises a chassis 57, an actuator 49 (preferably a rotary actuator), including an opposing pair of load beams 44 having a read/write head 46 disposed at the end of each load beam, a spindle motor 52 and a spindle 40, a load ramp 47, a shutter opening arm 48, and a load/eject mechanism which includes pinion 36, gear 24, sliding lever 22, and lever compression spring 23. The operation of the load eject mechanism is described more fully below. A disk cartridge can be inserted into the front of the drive in the direction indicated by the arrow. During insertion, the cartridge slides linearly along the top surface of chassis 57 and spindle motor 52 for engagement with the read/write heads 46. A system for disk cartridge hub engagement with the drive is described more fully in copending patent application Ser. No. 08/929,932 entitled "MEDIA HUB MOUNTING SYSTEM FOR MINIMIZING Z-AXIS TRANSLATION" filed Aug. 29, 1997, which is hereby incorporated by reference in its entirety.

Figure 2A:
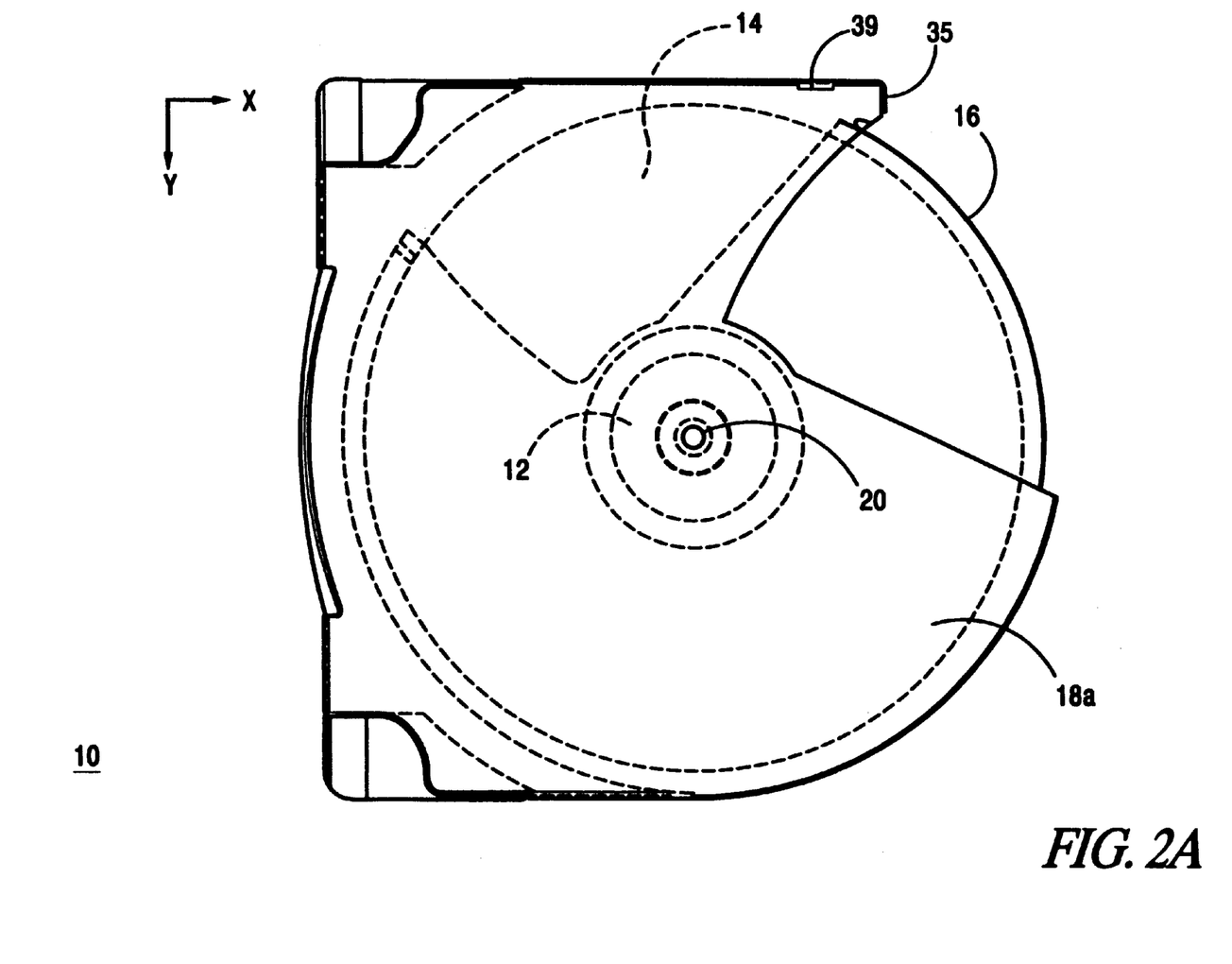
FIG. 2A is a top view of an exemplary cartridge for use with the present invention.
Figure 2B:
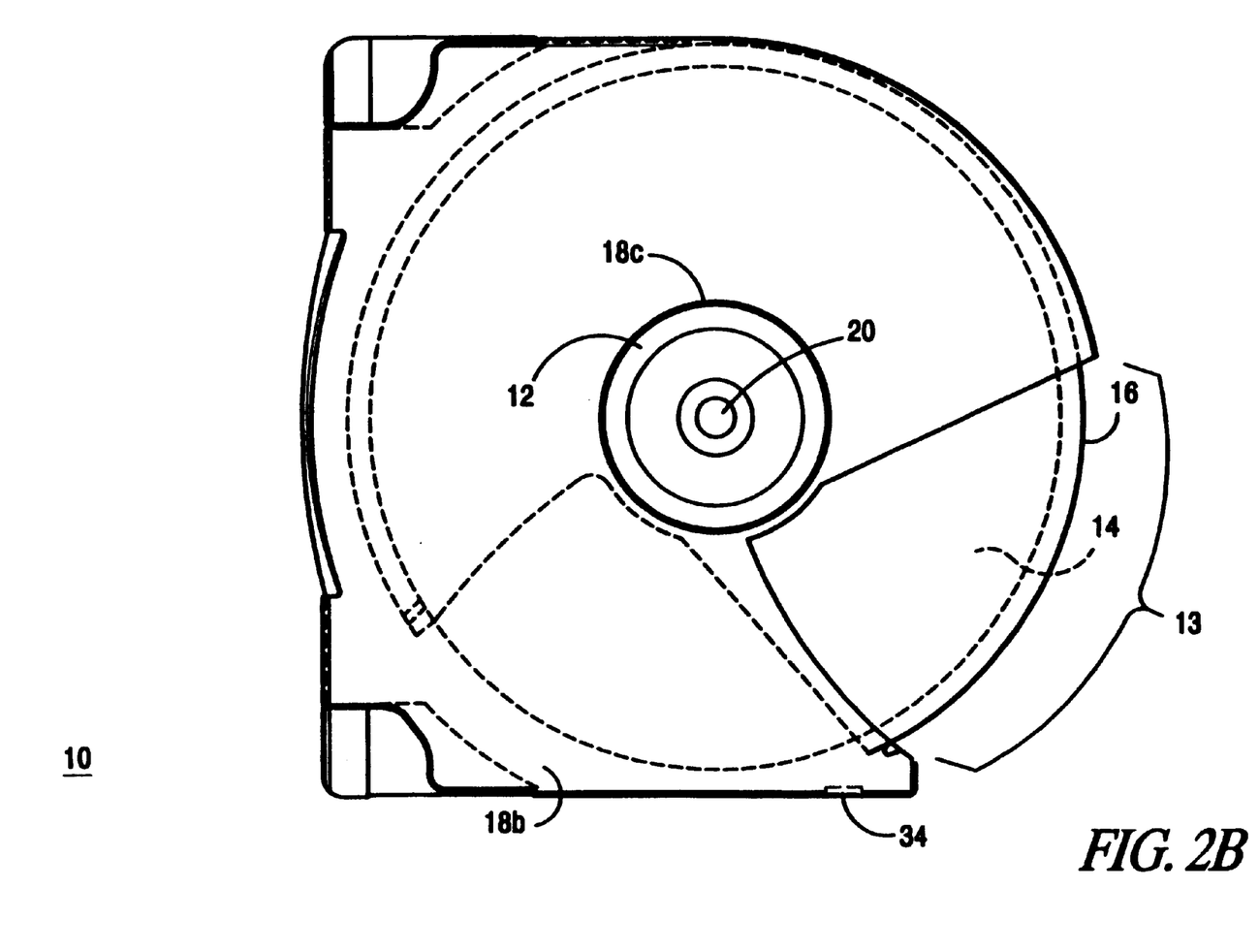
FIG. 2B is a bottom view of an exemplary cartridge for use with the present invention.

FIGS. 2A and 2B present top and bottom views of an exemplary disk cartridge 10 for use with the drive 50 of the present invention. Disk cartridge 10 comprises a flexible magnetic disk 14, a disk media hub 12, top and bottom cartridge shell halves 18a and 18b, a rotary shutter 16, and a shutter pivot pin 20. Shutter 16 rotates within cartridge 10 between an open position and a closed position. In the open position, shutter 16 is rotated away from a generally wedge shaped disk access opening 13 that is formed in cartridge shell 18, exposing the top and bottom surfaces of disk 14 for access by a read/write head or heads contained within a disk drive. In the closed position, shutter 16 is rotated over disk access opening 13, sealing disk cartridge 10 and protecting disk 14. The flexible magnetic disk 14 is formed of a thin polymer film, such as MYLAR, and has a thin magnetic layer uniformly dispersed on the top and bottom surfaces. The magnetic surfaces magnetically sensitize the flexible disk 14 and enable the storage of digital data when the surface is brought into magnetic communication with a magnetic transducer of the type commonly found in disk drives. Disk 14 is generally circular with a circular hole proximate the center of disk 14.

Media hub 12 is firmly secured to disk 14 such that the center of hub 12 is aligned proximate the center of disk 14. Media hub 12 is preferably attached to disk 14 via a well-known adhesive process. The disk and hub assembly are rotatably disposed between upper and lower cartridge shell halves 18a, 18b. Lower cartridge shell half 18b has a substantially circular spindle access opening 18c such that a disk drive can provide rotational power to disk 14 via hub 12. Preferably, said access opening presents a rounded edge.

Cartridge shell 18 also comprises a side cut-out 34 and abutment surface 35. As explained more fully below, cut-out 34 and abutment surface 35 engage sliding lever 22 during cartridge insertion and ejection. Cut-out 34 functions to retain the cartridge in drive 50 and ensure proper cartridge insertion while abutment surface 35 provides a flat surface for engagement and spring loading of sliding lever 22.

Figure 3A:
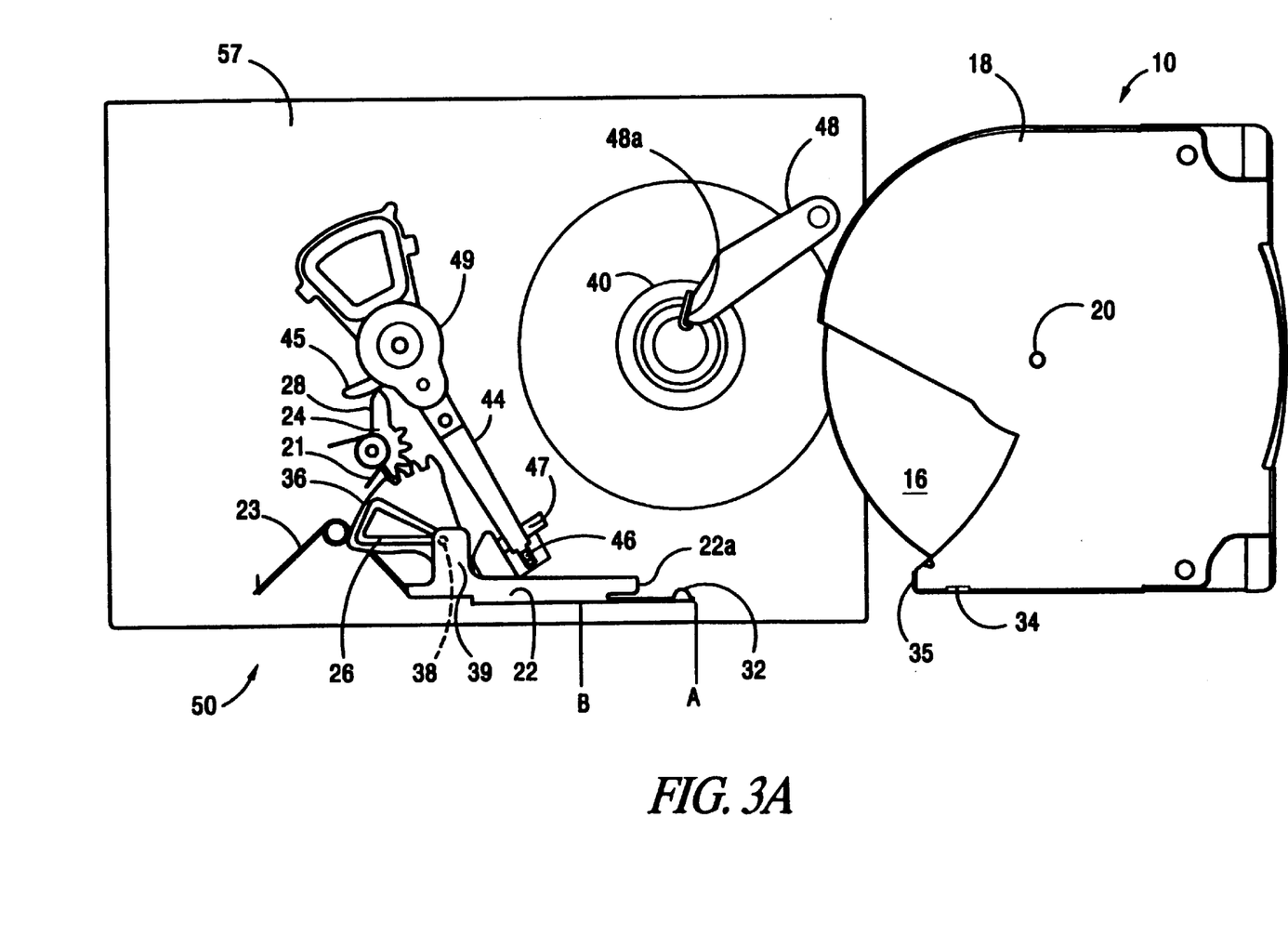
FIG. 3A shows the cartridge of FIG. 2 in an eject/pre-insertion position in relation to the drive of the present invention.
Figure 3B:
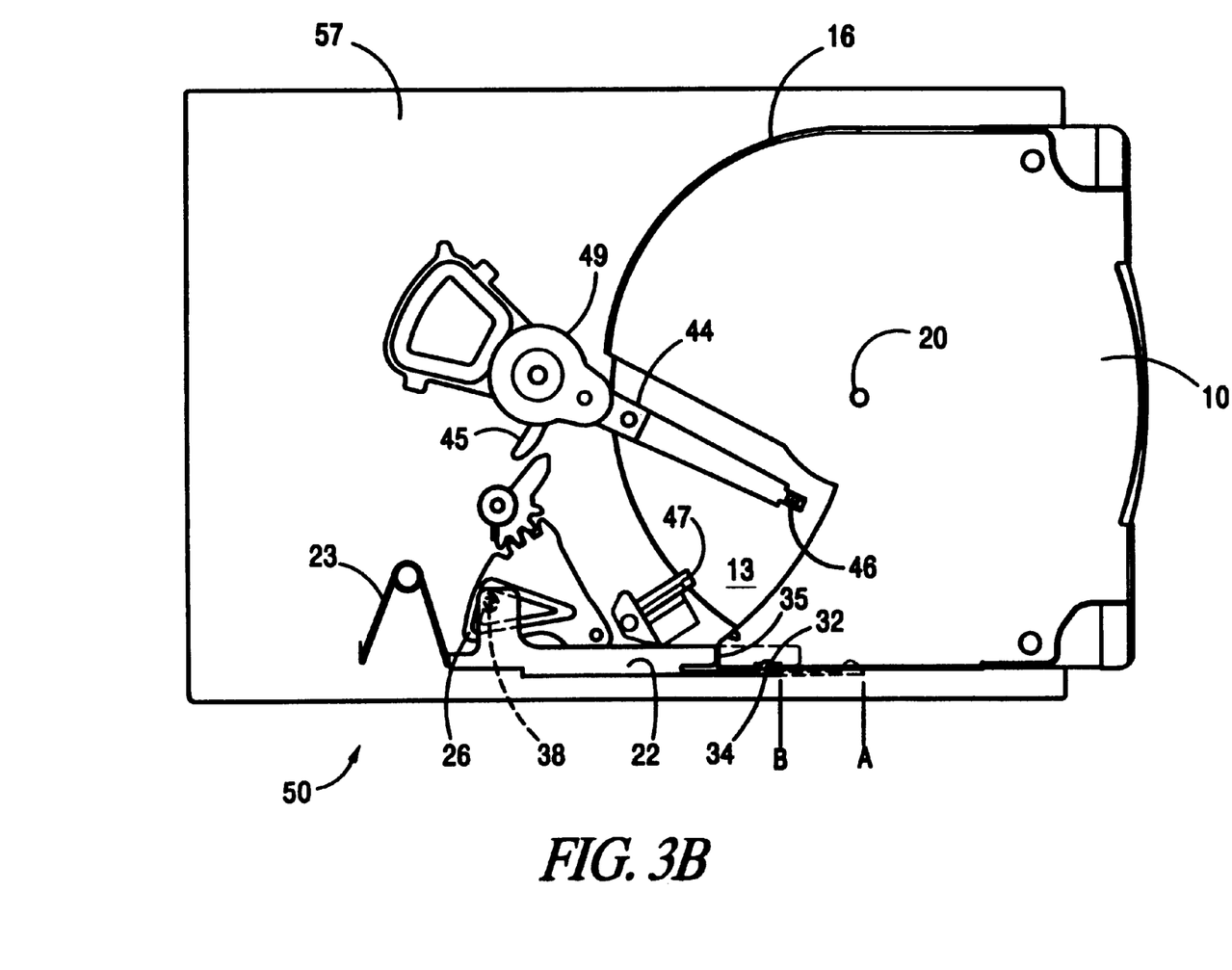
FIG. 3B shows the cartridge of FIG. 2 in a pre-eject/loaded position in relation to the drive of the present invention.

Referring now to FIGS. 3A and 3B, the operation of disk drive 50 in conjunction with a cartridge 10 is illustrated. FIG. 3A shows the drive mechanisms in the positions that are assumed prior to insertion of a cartridge 10, which is the same positions that are assumed after ejection of a disk cartridge. By contrast, FIG. 3B shows the positions of the drive mechanisms when a cartridge is fully inserted and the drive is operational. Referring first to FIG. 3A, actuator 49 is retracted onto load ramps 47. Sliding lever 22 is released (i.e., biased forward). And, shutter operating arm 52 is ready to engage and rotate open a shutter 16. Shutter operating arm 52 comprises a finger 52a that is adapted to engage shutter 16 and rotate it toward the open position during cartridge insertion. Spring tension is supplied to shutter 16 from within cartridge 10 so that shutter 16 rotates back to the closed position during ejection of cartridge 10 from drive 50. Referring next to FIG. 3B, the cartridge is shown in the fully inserted position in drive 50. The actuator 49 is now allowed to move its read/write heads 46 across the surface of disk 14, read and writing information. Spring 23 is loaded to provided an ejection force to cartridge 10 via sliding lever 22 during ejection of cartridge 10 from drive 50.

Figure 4A:
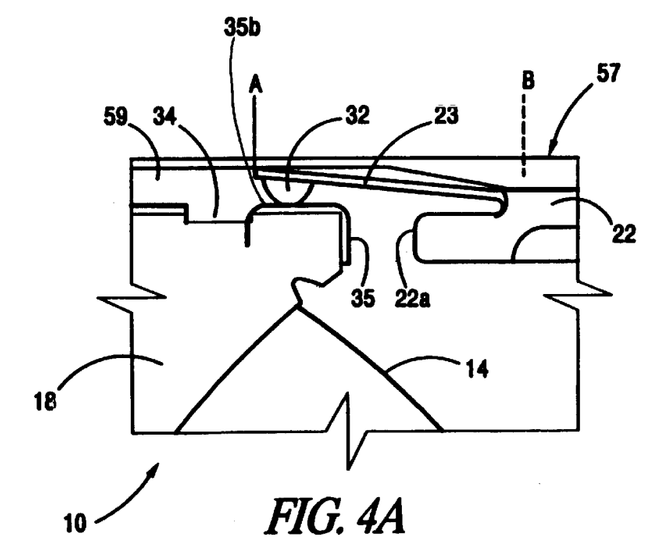
FIGS. 4A and 4B show the operation of the cartridge retention mechanism in accordance with the present invention.
Figure 4B:
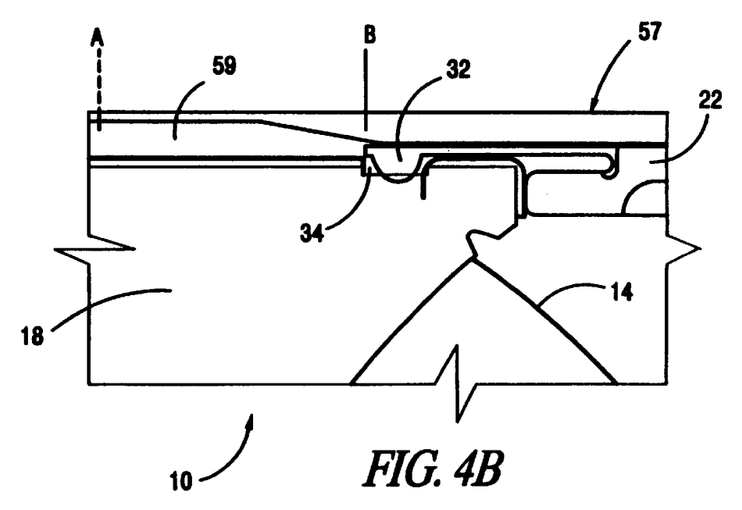

Referring also to FIGS. 4A and 4B, the operation of sliding lever 22 is further illustrated. Sliding lever 23 comprises a flexible arm 23 with a protuberance 32 proximate the distal end. Flexible arm 23 comprises a flexible material that bends with the application of a sidewards force. Moreover, protuberance 32 has a shape, preferably cammed, that is adapted to engage the front corner 35 of cartridge 10 and to facilitate sidewards movement of flexible arm 23. As cartridge 10 is inserted into drive 50, protuberance 32 engages the front corner 35 of cartridge 10. As a result, when a cartridge engages protuberance 32, it rides up onto and slides along the side wall 35b of cartridge 10. An opening 59 in the sidewall of chassis 57 provides clearance for the flexible arm 23 to flex away from cartridge 10 as cartridge 10 slides into the drive. When cartridge 10 is sufficiently far enough into drive 10, protuberance 32 aligns with cut-out 34 in cartridge 10 proximate the position indicated by line "A"

and flexes back, engaging cut-out 34. As cartridge 10 is inserted yet further into drive 50, abutment surface 35 of cartridge 10 contacts an end 22a of sliding lever 22, thereby urging sliding lever 22 to slide in tandem with cartridge 10 as cartridge 10 continues into drive 50. As cartridge 10 moves further into drive 50, sliding lever 22 slides from a position proximate the line "A" to a position proximate the line "B". At this point, flexible arm 23 has moved into chassis 57 past sidewall opening 59 thereby constraining flexible arm 23 by the chassis sidewall. Because the sidewards movement of flexible arm 23 is thus constrained, cartridge 10 is locked into drive 50. Furthermore, the insertion force on cartridge 10 and sliding lever 22 compressively loads spring 23 (see FIG. 3B).

Figure 5A:
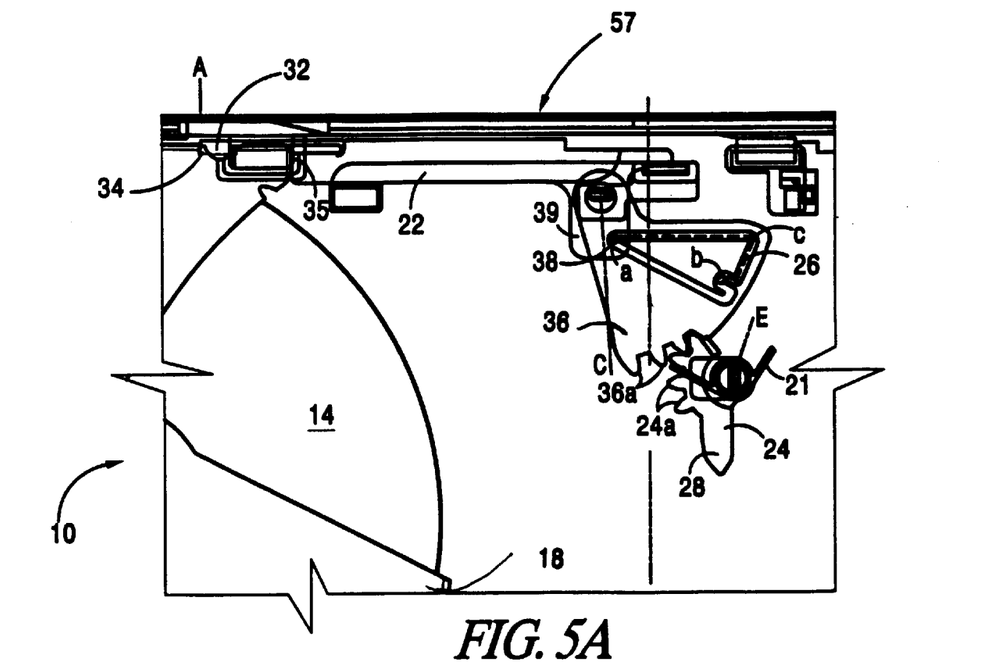
FIGS. 5A and 5B show the operation of the load eject lever in conjunction with the gear and pinion mechanism of the present invention.
Figure 5B:
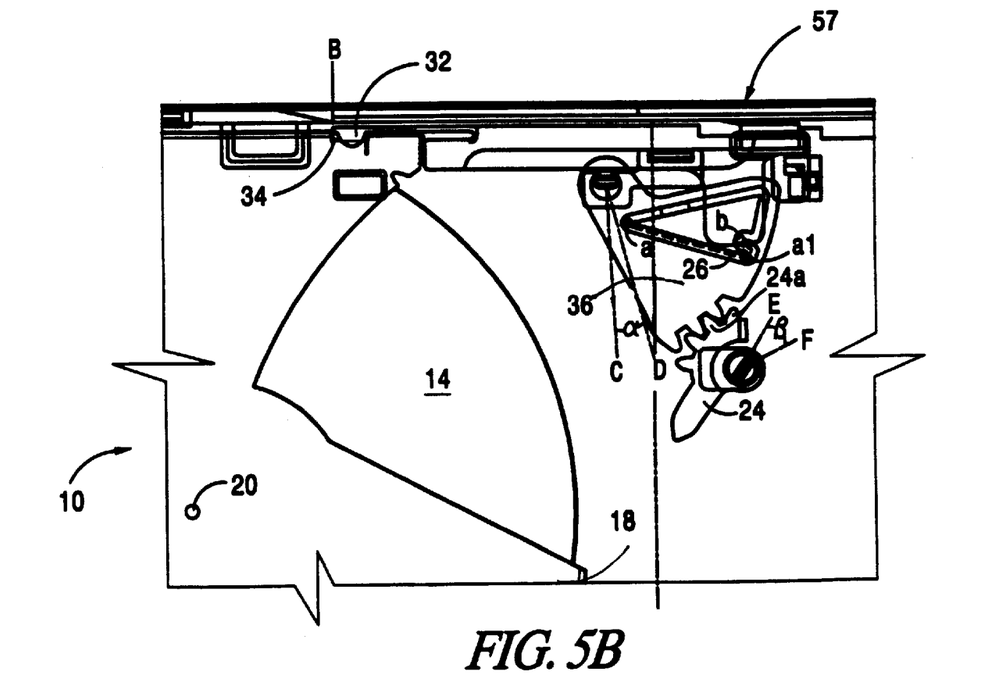

Referring now to FIGS. 5A and 5B in conjunction with FIGS. 3A and 3B, the operation of the load/eject mechanism of the present invention is described. From a user's standpoint, a cartridge 10 is loaded into operating position in drive 50 by pushing the cartridge 10 forward into drive 50 and then releasing the cartridge. Cartridge 10 is ejected from drive 50 by again pushing cartridge 10 forward into drive 50 and releasing. The load eject mechanism that provides this user interface comprises the sliding lever 22, pinion 36, and gear 24. Pinion 36 comprises teeth 36a, and race 26. In addition to the details provided above, sliding lever 22 comprises an ear 39 with a post 38 projecting downwardly from ear 39 and into race 26 of pinion 36. Gear 24 comprises a coil spring 21, latch 28, and teeth 24a. Teeth 24a engage teeth 36a of pinion 36, and latch 28 provides a mechanism to lock actuator 49 in a retracted position when not in operation.

In FIG. 5A, cartridge 10 has been pushed far enough into drive 50 such that protuberance 32 has engaged cut-out 34 in cartridge 10. At this point, cartridge abutment surface 35 has engaged sliding lever 22, which is in a position proximate the line "B". Pinion 36 is in a rotary position proximate the line "C" and gear 24 is in a rotary position proximate the line "E". Post 38 of sliding lever 22 is in race 26 proximate location "a". Now, as cartridge 10 is pushed further into drive 50, it urges sliding lever 22 from a position proximate line "A" to a position proximate line "B", moving post 38 along race 26 from a point proximate "a" to a point proximate "b". This movement causes the post to travel along the path indicated by the dashed lines in race 26 in FIG. 5B. The movement of post 38 along race 26 provides a rotational force to pinion 36 causing it to rotate counter-clockwise from a position proximate line "C" to a position proximate line "D". Simultaneously, as sliding lever 22 travels further into drive 50, spring 23 is loaded.

While pinion 36 rotate, teeth 36a engage teeth 24a, rotating gear 24, against the bias of spring 21, from a position proximate line "E" to a position proximate line "F". Just as cartridge 10 travels past its operating position, post 38 engages the end of the first leg of race 26 at point "a1", preventing further forward travel of post 38. Because post 38 cannot travel further forward, sliding lever 22 and cartridge 10 cannot move forward, signaling the user that cartridge 10 has been pushed fully into drive 50. When the user releases cartridge 10, spring 23 biases post 38 to travel within race 26 from point "a1" to point "b" where it comes to rest with cartridge 10 locked in the operating position. Latch 28 has rotated with gear 24 away from lever 45 on actuator 49 by an amount indicated by the angle between lines "E" and "F". As a result of the rotation of latch 28, actuator 49 is free to move read/write heads 46 over the surface of disk 14.

Figure 5C:
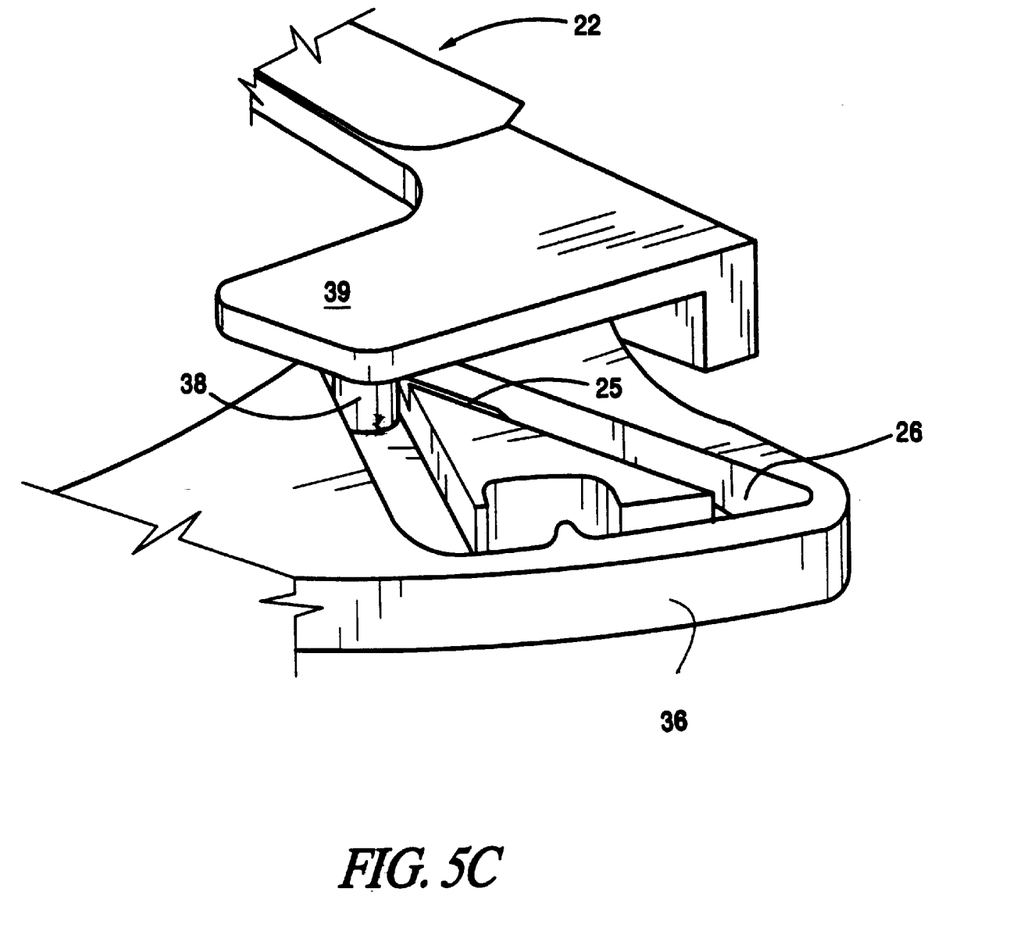
FIG. 5C shows an isometric view of pinion and sliding lever engagement.

FIG. 5C shows an isometric view of the engagement between post 38 of sliding lever 22 and race 26 of pinion 36.

Race 26 is inset into pinion 36 providing a track for post 38. Post 38 projects downwardly from ear 39 of sliding lever 22 into race 26. Ramp 25 in race 26 helps control the direction of travel of post 38 in race 26, ensuring that post 38 can only travel around race 26 in a counter-clockwise direction.

Disk ejection is reversed from the process described above. To start the ejection, a user once again push cartridge 10 forward into drive 50. The forward movement of cartridge 10 moves sliding lever 22 into drive 50. This forward movement of lever 22 moves post 38 in race 26 from a point proximate "b" to a point proximate "c". Simultaneously, pinion 36 is free to rotate clock-wise with the aid of spring loaded gear 24. At this point, forward movement of cartridge 10 is once again constrained, indicating to the user to stop pushing on cartridge 10.

As the user stops pushing on cartridge 10, spring 23 biases sliding lever 22 from a point proximate line "B" to a point proximate line "A", as post 38 moves down race 26 from point proximate "c" to point proximate "a". The spring force applied to sliding lever 22 also provides a force to eject cartridge 10 from drive 50. Meanwhile, as spring 21 rotates gear 24 counter-clockwise, latch 28 moves actuator 49 to a parked position via lever 45. The heads are parked by moving load beams 44 and heads 46 onto load ramp 47. The mechanism for loading and unloading heads 46 is described in further detail in co-pending patent application Ser. No. 08/320,534(Attorney Docket No. IOM-9555) entitled "SCISSORING LOAD RAMPS FOR A REMOVABLE MEDIA DISK DRIVE" filed Aug. 29, 1997, which is hereby incorporated by reference in its entirety.

The above description of preferred embodiments is not intended to impliedly limit the scope of protection of the following claims. Thus, for example, except where they are expressly so limited, the following claims are not limited to applications involving disk drive systems.

What is claimed is:

1. A disk drive of the type accepting a removable cartridge, comprising:

a chassis;

an actuator coupled to said chassis and having an arm with a read/write head on a distal end thereof;

a sliding lever slidably coupled to said chassis and adapted to engage the removable cartridge and slide with said cartridge between an insertion and ejection position, said sliding lever having a post disposed on an end thereof;

a bias means forcing said sliding lever toward said ejection position; and a rotatable pinion having a substantially triangular race having three legs and a catch in a second leg thereof, said race accepting said post for travel therein such that said post travels along a first leg of said race when a first force is applied said cartridge moving it to said insertion position, said bias means moving said post into said catch when said first force is released such that said cartridge is locked in said insertion position.

2. The disk drive as recited in claim 1 wherein said bias means comprises a spring.

3. The disk drive as recited in claim 2 further comprising a pivoting pinion, said race being disposed in said pinion, said pinion pivoting between a first and second position, wherein said pinion rotates to the first position when said post travels along said race to said catch and wherein said pinion rotates to the second position when said post travels along said race from said catch and along said third leg.

4. The disk drive as recited in claim 3 further comprising actuator locking means coupled to said pinion for locking said actuator in a parked position when said pinion is in said second position and releasing said actuator from said parked position when said pinion is in said first position.

5. The disk drive as recited in claim 4 wherein said actuator locking means comprises a latch connected to said actuator and coupled with said pinion.

6. The disk drive as recited in claim 1 wherein said actuator comprises a rotary actuator.

7. The disk drive as recited in claim 1 wherein said actuator comprises a linear actuator.

8. The disk drive as recited in claim 1 wherein said post travels out of said catch and along said second leg of said race when a second force is applied to said cartridge, said bias means moving said post along a third leg of said race when said second force is released such that said sliding lever moves to said ejection position thereby ejecting said cartridge.

* * * * *